United States Patent [19]

Larson

[11] 4,245,855

[45] Jan. 20, 1981

[54] VEHICLE STABILIZER

[75] Inventor: Thomas M. Larson, Hixon, Tenn.

[73] Assignee: Dover Corporation, Chattanooga, Tenn.

[21] Appl. No.: 23,257

[22] Filed: Mar. 23, 1979

[51] Int. Cl.[3] .................... B60S 9/12

[52] U.S. Cl. .................... 280/765; 212/189; 254/86 H

[58] Field of Search .................... 280/765, 763, 766, 755, 280/6.1; 254/86 H, 86 R; 212/145

[56] References Cited

U.S. PATENT DOCUMENTS

| | | | |
|---|---|---|---|
| 2,855,111 | 10/1958 | McIntyre | 212/145 |
| 3,096,065 | 7/1963 | Horne | 280/763 |
| 3,107,021 | 10/1963 | Dempster et al. | 212/145 |
| 3,125,352 | 3/1964 | Gouin | 280/763 |
| 3,262,582 | 7/1966 | Pitman et al. | 280/765 |
| 3,421,793 | 1/1969 | Pioch | 280/755 |
| 3,450,415 | 6/1969 | Martin | 280/763 |
| 3,801,068 | 4/1974 | Kopas | 280/765 |
| 3,912,289 | 10/1975 | Czajkowski | 280/6.1 |
| 3,981,514 | 9/1976 | Visser | 280/765 |
| 4,118,054 | 10/1978 | Vigerie | 280/765 |

FOREIGN PATENT DOCUMENTS

| | | | |
|---|---|---|---|
| 2407365 | 8/1974 | Fed. Rep. of Germany | 280/765 |
| 1500273 | 11/1967 | France | 280/765 |

*Primary Examiner*—David M. Mitchell
*Attorney, Agent, or Firm*—Alan Ruderman

[57] ABSTRACT

A lateral stabilizer for large dual purpose vehicles has an hydraulic cylinder on each side of the vehicle pivotably mounted on the vehicle frame at a point displaced laterally from the vehicle center-line and below the axis of the cylinder so the cylinder can rotate from a horizontal position to a vertically inclined position. A flexible tension member is connected at one end adjacent the free end of the cylinder rod and at its other end to the frame adjacent the vehicle center-line and below the stored cylinder. The tension member is relaxed until hydraulic fluid is supplied to the cylinder and the cylinder rod extends to the point at which the member is fully extended. Further extension of the rod causes the tension member to rotate the cylinder about its pivot.

9 Claims, 3 Drawing Figures

Fig. I

VEHICLE STABILIZER

BACKGROUND OF THE INVENTION

This invention relates to a vehicle stabilizer for providing lateral stability to resist overturning forces and more particularly to a self erecting stabilizer which, for example, can be used with dual purpose vehicles which serve for mounting wreckers or cranes and for pulling trailers.

Large wrecker or crane mounted vehicles such as those used for towing trucks or the like must have sufficient lateral stability to resist the forces tending to tip the vehicle when loading. Although a wide body vehicle provides greater lateral stability, the width of the tractor portion of the vehicle is limited by other considerations, not the least of which is the width of the highways upon which they travel. Thus, it is not uncommon to find vehicles of this type provided with some form of lateral stabilizer consisting of support legs positioned outboard of the wheels. These legs are positioned on the ground when the vehicle is loading and act to support the vehicle which may have the wheels thus lifted off the ground.

The construction of the known stabilizers are such that when in the inoperative or storage position they require a relatively large storage space and can interfer with the ground during certain vehicle operations. The available space for storage of the stabilizers is a consideration which can be critical to their use especially on dual purpose vehicles. It is desirable for stability when moving along a highway that the wheels of the vehicle be most widely spaced tranverse to the vehicle chassis. If the stabilizers in the inoperative position remain outboard of the vehicle wheels the effective width of the vehicle is increased and the stabilizers are in a position better served by the wheels.

It is obviously undesirable to position the stabilizer above the tractor bed—the space reserved for the pay load. Furthermore, in vehicles having what is known as a fifth wheel, i.e., the coupling plate on the tractor that couples to the trailer, the available space for locating the stabilizer under the bed, is between the fifth wheel, the tire clearance and the departure angle. This latter angle being the angle between the rear of the rear wheels and the rear of the bed, and it must be greater then the grade any ramp the vehicle will encounter to avoid interference between the tractor and the ramp.

Another consideration in the construction of a stabilizer is its ease of use. Manual deployment of the stabilizer creates operator safety problems especially for vehicles of the larger sizes, and if improperly deployed the stability of the vehicle can be affected.

The known prior art, as evidenced by U.S. Pat. Nos. 3,096,065; 3,107,021; 3,125,352; 3,421,793; 3,450,415; 3,912,289 and 3,053,052, is deficient in one or more of the above considerations, storage and deployment being the main deficiencies.

SUMMARY OF THE INVENTION

The present invention overcomes the shortcomings of the prior art by providing stabilizer having a power unit including a linearly movable output member on each side of the vehicle constructed and arranged so that it is stored horizontally, with no vertical projections, within a minimum of space and with a maximum of ground clearance and which, when actuated, is self-erecting as the power unit moves from the horizontal to a vertical disposition. More particularly, the power unit is pivotably mounted on the vehicle frame at a point displaced from its axis. A tension member is connected to the output member and to the frame at a point below the center-line of the stored power unit. In the preferred form of the invention, the pivot point of the power unit mount is outboard of the vehicle center-line and below the center-line of the power unit, and the tension member, which may be a cable, wire, rope, chain or the like, is connected to the vehicle frame adjacent the vehicle center-line and below the power unit mount. In the inoperative or stored position of the power unit, the tension member is in a relaxed or slackened condition, however, when the power unit is actuated and the output member extends, the tension member becomes active as the slack is removed. When the slack is effectively removed, the tension member causes the power unit to rotate about the pivot mount from the horizontal position toward a vertical inclination until the output member is fully extended. The power unit preferred is an hydraulic cylinder having a cylinder rod as the output member.

Consequently, it is the primary object of this invention to provide a stabilizer for providing lateral stability to heavy load lifting vehicles that requires a mimimum of storage space and is effectively self-erecting.

Another object of this invention is to provide a lateral stabilizer for vehicles in which a single power unit operates to move each stabilizing leg from a horizontally stored position to a vertically deployed position.

A further object of this invention to provide an hydraulic stabilizer for vehicles which is stored substantially horizontally and which when deployed shifts to the proper vertical inclination.

BRIEF DESCRIPTION OF THE DRAWINGS

The particular features and advantages of the invention as well as other objects will become apparent from the following description taken in connection with the accompanying drawings, in which.

DESCRIPTION OF THE PREFERRED EMBODIMENT

Figure 1:
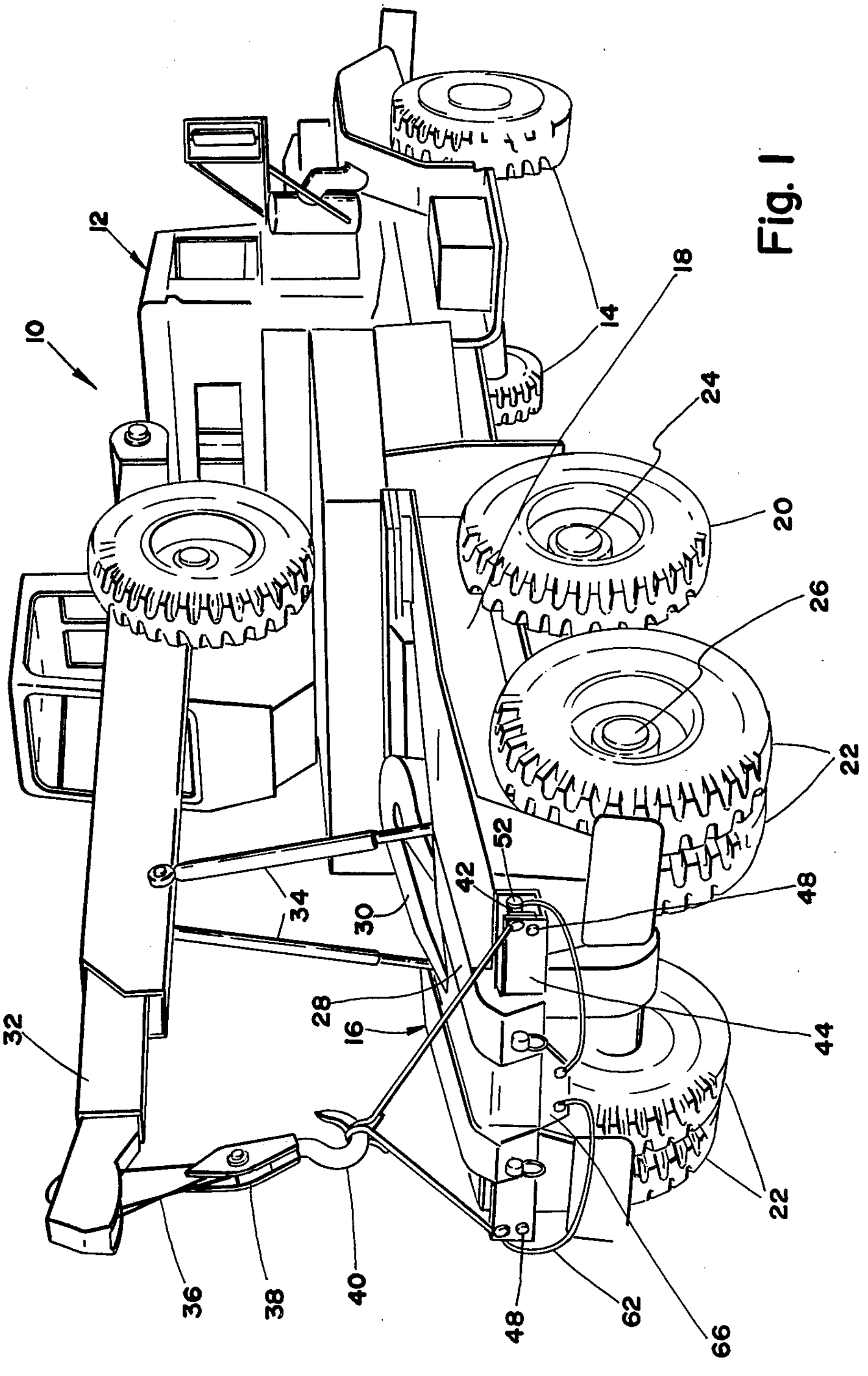
FIG. 1 is a perspective view of a dual purpose vehicle incorporating a lateral stabilizer constructed in accordance with the principles of the present invention.

Referring to the drawings, the stabilizer is shown in the environment of a dual purpose vehicle generally designated 10 including a cab 12 supplying the motive force and steering means through front wheels 14, to the tractor 16 coupled thereto. The tractor includes a frame 18 and is supported on the roadway by two pair of wheels 20 and 22 mounted on respective axles 24 and 26 carried by the frame. Secured to the frame above the wheels is a bed 28 for carrying the payload. A fifth wheel coupling member 30 may be secured to the frame above the bed for coupling a trailer (not illustrated) to the tractor. The tractor also carries wrecker equipment including a crane 32 pivotably mounted at the front and supported by support arms 34 mounted on the bed 28. The crane includes the conventional cable 36 and hoisting members such as pulley 38 and hook 40 so that the vehicle may lift and tow trucks and other large vehicles that are damaged and require aid.

When lifting relatively heavy loads by the crane, the lateral stability of the vehicle is uncertain where the fixed tread or width of the tractor wheels 22 provide the only support. Thus, it is common to provide a stabilizer for increasing the lateral stability to resist tipping when lifting a load. The stabilizer applies support for the vehicle on the ground beyond the width of the wheels, i.e., further from the vehicle longitudinal center-line. The present invention provides a compact stabilizer that may be stored behind the fifth wheel 30 so as not to interfer with a trailer coupled thereto, and between the tire clearance and the departure angle.

Figure 2:
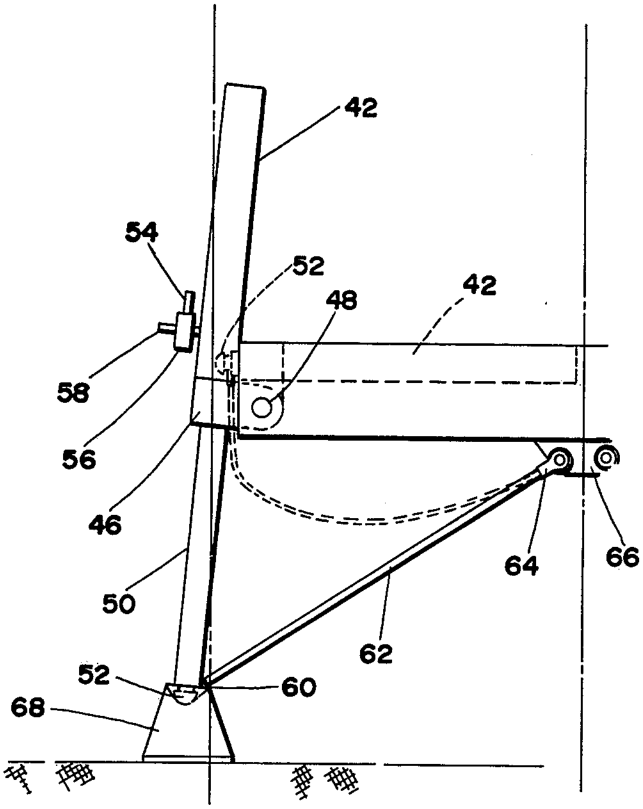
FIG. 2 is an elevational view in diagrammatic form of the stabilizer elements on each lateral side of the vehicle center-line.

The stabilizer includes a power unit in the form of an hydraulic cylinder 42 on each lateral side of the vehicle center-line. The cylinders may be horizontally stored in a housing 44 located behind the wheels within the departure angle and secured to frame 18 of the tractor. As best illustrated in FIG. 2, each cylinder 42 is mounted in the housing by means of a bracket 46 secured to the outer end of the cylinder and which is pivotably attached to the housing by a journal pin 48 spaced from the major axis of the cylinder. Thus, the cylinder may be rotated from the horizontally stored position to a position where the major axis of the cylinder extends toward the roadway. Preferably the bracket 46 and pin 48 are such that the pin is below the cylinder axis when the cylinder is horizontal, and the housing 44 is open at the top so that the cylinder will swing outwardly away from the vehicle in the operative condition. Each cylinder includes a piston or cylinder rod 50 having a lug 52 on its free end and which is linearly movable between a retracted position within the cylinder and a fully extended position. The linear position of the rod is conventionally determined by pressurized hydraulic fluid supplied to the cylinder through a supply line 54 and a valve 56 when the stabilizer is activated. When deactivated, the fluid from the cylinder is bled to a return line 58 from the valve back to the fluid supply.

Connected to the rod 50 adjacent to the lug 52 is one end 60 of a tension member 62 having its other end 64 connected to a bracket 66 secured to the vehicle frame below the housing 44 and thus below the axis of the stored cylinder and preferably close to the vehicle center-line. Preferably the member 62 is a flexible member such as a metal cable or wire rope, but may be a chain or articulating linkage including a toggle link so the tension member in the inactive condition is folded or collapsed unobtrusively below the housing 44 as illustrated in FIG. 1. The ends 60 and 64 of the member 62 are preferably pin connected respectively to the rod 50 and the bracket 66 to allow the member freedom of movement about these points. The fully extended length of the tension member 62 is such that it is fully extended when the rod 50 is fully extended in the operative position. As hereafter explained, the tension member is fully extended and tensed prior to full extension of the rod. A float 68 may be removably positioned on the end of the lug 52 prior to actuation of the cylinder so that when the rod is fully extended the load is more evenly distributed on the roadway. Moreover, the length of the member 62 and the location of the end 64 is such that when the rod 50 is fully extended the axis of the cylinder 42 is approximately 5 degrees to the verticle plane passing through the pin 48.

Figure 3:
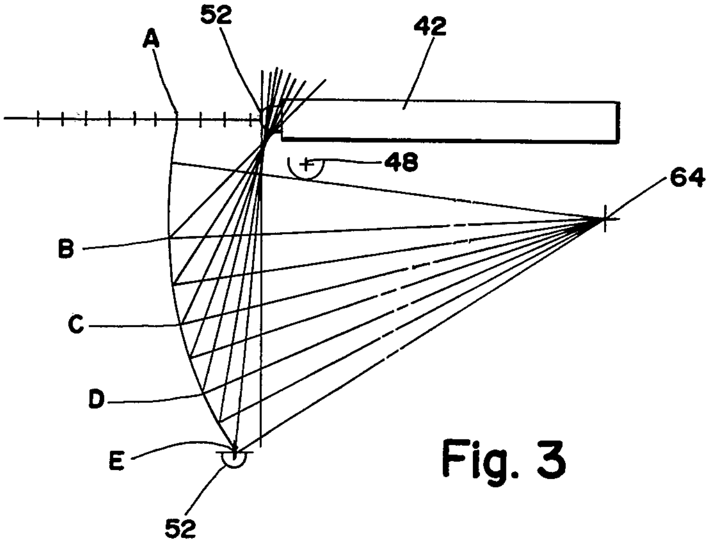
FIG. 3 is a view similar to that illustrated in FIG. 2, but with some of the elements removed and showing the locus of points when the stabilizer is actuated.

The operation of the stabilizer is best explained with reference to FIG. 3. When hydraulic fluid is applied to the cylinder 42, the rod 50 extends outwardly from the substantially horizontally disposed cylinder and the slack of the relaxed tension member 62 is gradually removed. When the rod reaches point A the member 62 is at its fully extended length, the slack is fully removed and the member is its tensed state. Further extension of the rod 50 causes the cylinder to rotate about the axis of pin 48 as the lug 52 follows the radius of movement of the tension member about the pivot at 64. The path of the lug 52 thus follows the locus of the points A, B, C, D and E at which point the float is in contact with the roadway. Further extension of the rod 50 elevates the vehicle and lifts the wheels 22 and 20 off the roadway. The vehicle is then fully supported by the rods and tension members. As stated above, the fully extended position of the rods is such that the axis of each cylinder is slightly inclined to the vertical plane and the contact of the floats 68 with the roadway is further from the vehicle axis than was that of the contact of the wheels. Thus, the lateral stability is increased. The self pivioting movement of the cylinders provides a simple operation of the stabilizer and allows a single cylinder to be used for deployment of the stabilizer from a horizontal storage position to a vertically inclined stabilization position.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus described the nature of the invention what is claimed herein is:

1. A stabilizer assembly for increasing the lateral stability of a vehicle having a frame supported above a roadway on spaced wheels having a fixed tread, said assembly comprising a power unit having a longitudinal axis and an output member linearly moveable substantially along said axis from a retracted position within said unit to a fully extended position substantially outside said unit, said output member having a free end extending from said unit at all times, journal means having an axis of rotation spaced from said longitudinal axis for mounting said power unit on the frame for pivotal movement about said axis of rotation from an inactive stored position wherein said longitudinal axis is spaced substantially from the roadway to an active position wherein said longitudinal axis extends toward the roadway, tension means of finite length having one end connected to said output member adjacent said free end and a second end connected to said frame at a location between said free end and said roadway when the power unit is in said inactive stored position, said tension means having a relaxed state when the output member is in the retracted position and a tensed state after the output member is partly extended, said ends of said tension means being spaced one from the other less than said finite length when in the relaxed state and equal to said finite length when in said tensed state, whereby upon further movement of said member beyond said partly extended position said power unit will pivot toward the roadway until the member is fully extended.

2. A stabilizer assembly as recited in claim 1 wherein said power unit comprises an hydraulic cylinder and said output member comprises a rod.

3. A stabilizer assembly as recited in claim 1 wherein said tension means comprises a flexible member.

4. A stabilizer assembly as recited in claim 1 wherein said axis of rotation is disposed between said said longtitudinal axis when the power unit is in the inactive stored position, and said roadway.

5. A stabilizer assembly as recited in claim 4 wherein said second end of said tension means is disposed between said axis of rotation and said roadway.

6. A stabilizer assembly as recited in claim 5 wherein said axis of rotation is always disposed between said free end of said output member and said second end of said tension means.

7. A stabilizer assembly as recited in claim 1, wherein said longitudinal axis is disposed substantially horizontal in said inactive stored position, and including a substantially horizontal housing secured to said frame, said housing having means defining an opening at the top for receiving said power unit, said journal means including means for mounting said power unit in said housing adjacent the free end of said output member, said axis of rotation being disposed between said longitudinal axis when the power unit is in the inactive stored position, and said roadway.

8. A stabilizer assembly as recited in claim 1 wherein the length of said tension means and the location of said second end is such that the axis of said power unit in the active position is disposed at an angle to a vertical plane passing through said journal means.

9. A stabilizer assembly as recited in claim 8 wherein said angle is approximately 5 degrees.

* * * * *